United States Patent
Schurz et al.

(10) Patent No.: US 12,320,598 B2
(45) Date of Patent: Jun. 3, 2025

(54) HEAT CONDUCTION DEVICE FOR AN ELECTRIC ENERGY STORAGE OF A MOTOR VEHICLE

(71) Applicant: Mercedes-Benz Group AG, Stuttgart (DE)

(72) Inventors: Andreas Schurz, Aichelberg (DE); Domenico Romano, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 218 days.

(21) Appl. No.: 18/006,027

(22) PCT Filed: Jul. 6, 2021

(86) PCT No.: PCT/EP2021/068629
§ 371 (c)(1),
(2) Date: Jan. 19, 2023

(87) PCT Pub. No.: WO2022/017776
PCT Pub. Date: Jan. 27, 2022

(65) Prior Publication Data
US 2023/0349646 A1  Nov. 2, 2023

(30) Foreign Application Priority Data
Jul. 20, 2020 (DE) ............... 10 2020 004 354.2

(51) Int. Cl.
*F28F 3/06* (2006.01)
*F28F 3/02* (2006.01)
*F28F 21/08* (2006.01)

(52) U.S. Cl.
CPC ............ *F28F 3/06* (2013.01); *F28F 3/027* (2013.01); *F28F 21/084* (2013.01); *F28F 2280/00* (2013.01)

(58) Field of Classification Search
CPC .. F28F 3/06; F28F 3/027; F28F 21/084; F28F 2280/00; F28F 2280/08; F28F 2280/06;
(Continued)

(56) References Cited

U.S. PATENT DOCUMENTS 10,516,192 B2   12/2019 Prevost et al.
2018/0034117 A1*  2/2018 Bang ................. H01M 10/6554
(Continued)

FOREIGN PATENT DOCUMENTS

CN   108461686 A  *  8/2018  .......... H01M 10/613
CN   109378420 A     2/2019
(Continued)

OTHER PUBLICATIONS

Pdf is translation of foreign reference CN 108461686 A (Year: 2018).*
(Continued)

*Primary Examiner* — Henry T Crenshaw
*Assistant Examiner* — Kamran Tavakoldavani
(74) *Attorney, Agent, or Firm* — Crowell & Moring LLP

(57) ABSTRACT

A heat conduction device for an electrical energy storage of an at least partially electric motor vehicle includes a heat conduction element that is configured to be in contact with a battery cell of the electrical energy storage and to dissipate heat from the battery cell. A spring element is configured to exert a defined spring force between the battery cell and the heat conduction element. The heat conduction element is rotatably disposed on a holding device of the heat conduction device and the spring element is disposed on the heat conduction element and/or on the holding device such that a rotational movement of the heat conduction element is cushioned.

10 Claims, 2 Drawing Sheets

(58) Field of Classification Search
CPC .......... F28F 2280/10; F28D 2021/0029; F28D 2021/0043; F28D 2021/008; H01M 10/613; H01M 10/617; H01M 10/625
See application file for complete search history.

(56) References Cited

U.S. PATENT DOCUMENTS

| | | | | |
|---|---|---|---|---|
| 2018/0309101 | A1* | 10/2018 | Nakai | H01M 50/296 |
| 2019/0221905 | A1* | 7/2019 | Shimizu | H01M 10/6557 |
| 2020/0168959 | A1* | 5/2020 | Hettrich | H01M 4/405 |
| 2021/0226275 | A1* | 7/2021 | Enkirch | H01M 10/6557 |

FOREIGN PATENT DOCUMENTS

| | | |
|---|---|---|
| DE | 10 2008 010 839 A1 | 8/2009 |
| DE | 10 2008 034 876 A1 | 1/2010 |
| DE | 10 2008 059 953 A1 | 6/2010 |
| DE | 10 2011 003 538 A1 | 8/2012 |
| FR | 3 066 326 A1 | 11/2018 |

OTHER PUBLICATIONS

PCT/EP2021/068629, International Search Report dated Oct. 20, 2021 (Three (3) pages).

German Search Report issued in German application No. 10 2020 004 354.2 dated Feb. 12, 2021, with Statement of Relevancy (Seven (7) pages).

Japanese-language Japanese Office Action issued in Japanese Application No. 2023-501558 dated Jan. 23, 2024 with English translation (5 pages.)

English-language Written Opinion (PCT/ISA/237) issued in PCT Application No. PCT/EP2021/068629 dated Oct. 2021 (6 pages).

* cited by examiner

HEAT CONDUCTION DEVICE FOR AN ELECTRIC ENERGY STORAGE OF A MOTOR VEHICLE

BACKGROUND AND SUMMARY OF THE INVENTION

The invention relates to a heat conduction device for an electric energy storage of an at least partially electric motor vehicle.

It is already known from the prior art that a heat conduction paste or a heat conduction casting compound is used to cool an electrical energy storage, for example a high-voltage energy storage, in order to obtain a thermal contact with the cooling system of the electric energy storage in the motor vehicle. Heat conduction compounds in particular are very expensive and heavy. An application process of the heat conduction compound in the serial process is further difficult to control, and the danger of air pockets can arise during the application and lead to problems during the driving operation. Due to the adhesive effect, the battery blocks can further only be removed again with significant effort. Furthermore, the heat conduction compound or the heat conduction casting compound is only conditionally recyclable.

DE 10 2008 010 839 A1 relates to a battery having a heat conduction plate arranged in a battery housing for tempering the battery, wherein several individual cells that are electrically connected with one another in parallel and/or in series are connected to the heat conduction plate in a heat conducting manner. The battery is in particular characterised by a spring element, by means of which the individual cells can be pressed against the heat conduction plate in a defined manner.

DE 10 2008 034 876 A1 relates to a battery having a heat conduction plate arranged on the battery housing for tempering the battery, wherein several individual cells that are electrically connected to each other in parallel and/or in series by means of a cell connector board are connected to the heat conduction plate in a heat conducting manner, wherein at least one spring element is provided, by means of which the individual cells can be pressed against the heat conduction plate in a defined manner. One or several biasing elements are arranged on the cell connector board or on the metal plate for biasing and fixing the spring element.

DE 10 2011 003 538 A1 relates to a device for pressing a cooler onto a battery, wherein the cooler has at least one cooling surface for absorbing or releasing heat energy, and wherein the battery has at least one contact surface for applying to the cooling surface of the cooler. The device has a pressing part having at least one spring-elastic pressing element for transferring a pressing force to a partial region of a surface of the cooler facing away from the battery. The device further has a suspension device for suspending the pressing part on the battery, wherein the suspension device is designed to generate a suspending force working against the pressing force if the cooler is arranged on the battery and the suspension device is suspended on the battery.

The object of the present invention is to create a heat conduction device, by means of which an improved dissipation of heat from the electrical energy storage to a cooling device can be provided.

An aspect of the invention relates to a heat conduction device for an electrical storage of an at least partially electric motor vehicle, having at least one heat conduction element that is designed to be in contact with at least one battery cell of the electrical energy storage and to dissipate heat from the at least one battery cell, and having at least one spring element that is designed to exert a defined spring force between the at least one battery cell and the at least one heat conduction element.

It is provided that the heat conduction element is rotatably arranged on a holding device of the heat conduction device, and the spring element is arranged on the heat conduction element and/or on the holding device in such a way that a rotational movement of the heat conduction element is cushioned.

It is thus enabled that an improved heat dissipation from the at least one battery cell to a cooling device can be provided. Both the heat conduction element and the holding device can in particular be produced very cheaply. The heat conduction plates in the motor vehicle or in the electrical energy storage can further be very easily mounted or dismounted. A very simple and reversion-friendly battery construction can further be provided, whereby the battery construction too is in particular cost-efficient and has a good recyclability. A weight saving can further be realised, in particular in relation to a conventional heat conduction paste known from the prior art.

It can in particular be provided that the heat conduction element is in contact with a housing, in particular a housing wall of the housing, of the electrical energy storage. In other words, the heat conduction element can be in contact with the at least one battery cell on one side, and with the housing on the other side, in order to dissipate the heat. The heat conduction path from the at least one battery cell, via the heat conduction element to the housing can thus be provided. A cooling device of the electrical energy storage is in particular formed on the side of the housing, such that the heat can be further dissipated. The cooling device can be fluid, for example.

It can further be provided that the electrical energy storage has a plurality of battery cells and/or battery modules, wherein the heat conduction device is designed to dissipate the heat of the plurality of battery cells and/or battery modules.

The heat conduction device is further in particular formed on an underside of the electrical energy storage, in particular on a lower housing wall.

According to an advantageous embodiment, the heat conduction element is in particular formed from aluminum. Aluminum is in particular a good heat conductor, such that the heat can be better dissipated from the battery cell. Aluminum is furthermore very light, such that the heat conduction device can be provided in a weight-reduced manner.

It has further proved advantageous that the holding device is formed from plastic. A holding device that can be easily produced can thus in particular be provided. Plastic is also durable, and in particular suitable for being installed in an electrical energy storage, as plastic does not conduct electricity, for example. Plastic is also light, such that the heat conduction device is formed in a weight-reduced manner.

In a further advantageous embodiment, the holding device is a plastic injection-moulded part. It is thus enabled that the holding device can be easily injected. The holding device can thus be produced in an injection moulding tool at little production cost.

It is also advantageous if the heat conduction element is formed in an S-shape when viewed in a cross-section of the heat conduction element. An upper limb of the S-shape can in particular be coupled with the one battery cell, for example. A further limb of the S-shape can in particular be coupled with the housing, in particular a lower limb of the S-shape. It can be enabled via the S-shape that a thermal coupling between the at least one battery cell and the housing can be produced in a manner that is as easy as possible. The S-shape is further easily rotatable around a point of rotation, such that the rotation can be carried out in a simpler way.

It has further proved advantageous if the heat conduction device has a plurality of respectively rotatably mounted heat conduction elements. It is thus in particular enabled that a good heat conductivity of the heat conduction device is provided on the basis of the plurality of mounted heat conduction elements. The heat of the at least one battery cell can thus be dissipated in an improved manner.

It has further proved advantageous if the plurality of respectively rotatably mounted heat conduction elements are arranged in layers. The heat conduction element can here in particular be formed in an S-shape. A simple layering can be provided by the S-shape. This particularly has the advantage that the thermal heat conduction elements can be arranged in layers, whereby the number of thermal transfer elements, in particular the heat conduction elements, can be significantly increased. An improved heat dispersal of the electrical battery cells can thus be provided. The heat conduction elements thus in particular respectively overlap at least partially.

It has further proved advantageous if the spring element is formed from plastic. A simple and weight-reduced variant of the spring element can thus in particular be provided. This variant can in particular be very easily produced and easily mounted.

It is further advantageous if the spring element is formed as a leaf spring. The spring element then in particular rests at least partially on the heat conduction element. A simple spring effect can thus be generated via the leaf spring.

In a further advantageous embodiment, two spring elements are respectively arranged on the heat conduction element. One spring element can rest on an upper limb and a second spring element on the lower limb of the S-shape in the case of an S-shaped embodiment of the heat conduction element, for example. The spring elements can in particular be supported on the holding device such that a spring effect can be provided.

A further aspect of the invention relates to an electrical energy storage having a heat conduction device according to the preceding aspect. The electrical energy storage is in particular formed as a high-voltage battery. The electrical energy storage in particular has a cooling device for cooling the at least one battery cell.

Another further aspect of the invention relates to a motor vehicle having an electrical energy storage according to the preceding aspect. The motor vehicle is in particular formed at least partially electrically, in particular completely electrically.

Further advantages, features and details of the invention result from the following description of preferred embodiments and by reference to the drawings. The features and combinations of features previously given in the description, and the features and combinations of features given subsequently in the description of figures and/or shown only in the figures, can be used not only in the respectively given combination, but also in other combinations or alone without moving beyond the scope of the invention.

DETAILED DESCRIPTION OF THE DRAWINGS

Figure 1:
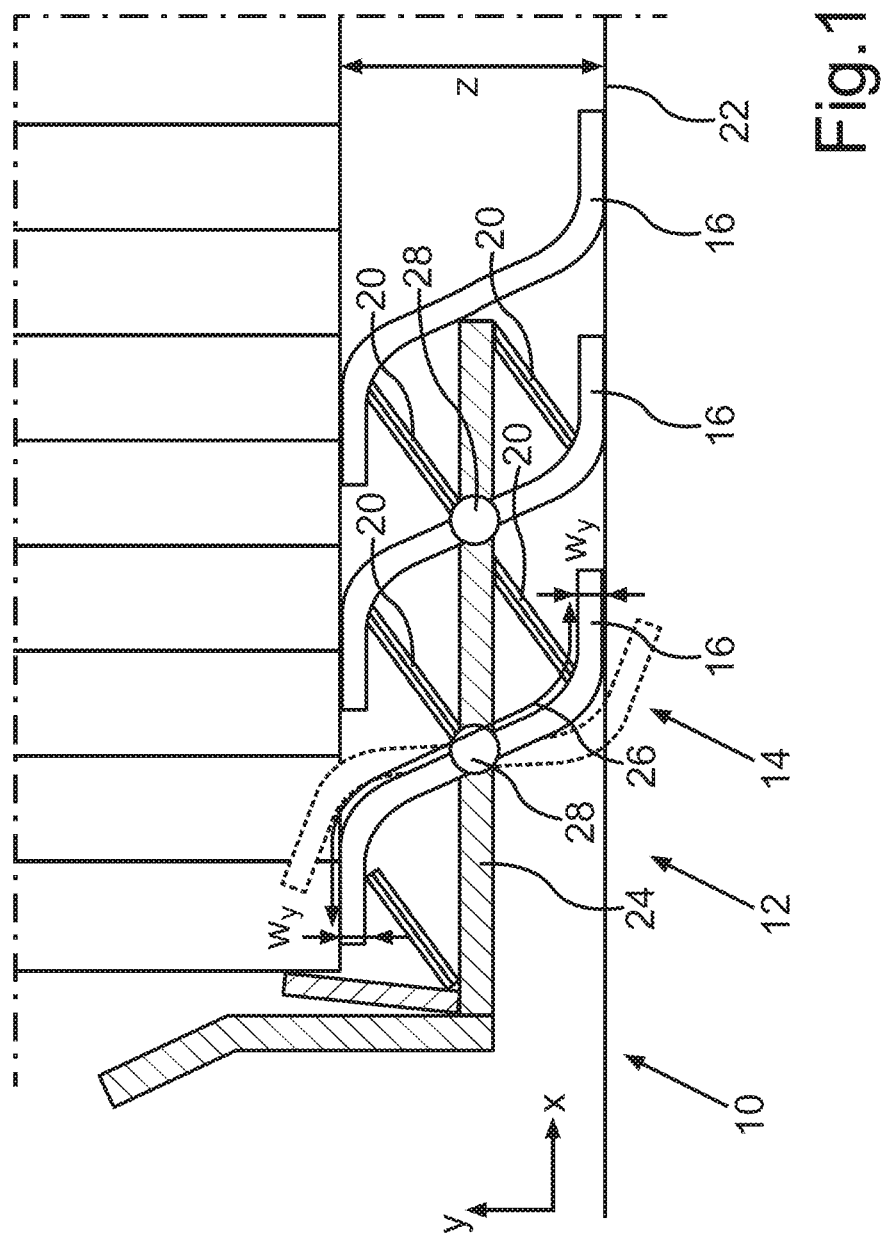
FIG. 1 shows a schematic side view of an embodiment of an electrical energy storage having an embodiment of a heat conduction device.

The same elements, or elements that have the same function, are provided with the same reference numerals in the figures.

FIG. 1 shows an embodiment of an electric energy storage 10 for an at least partially electric motor vehicle 12 that is depicted purely schematically in a schematic side view. The motor vehicle 12 can in particular be operated completely electrically.

FIG. 1 further shows a heat conduction device 14 for the electrical energy storage 10. The heat conduction device 14 has at least one heat conduction element 16, here in particular three heat conduction elements 16. The heat conduction element 16 is formed to be in contact with at least one battery cell of the electrical energy storage 10, and to dissipate heat Wy from the battery cell. It can in particular be provided that the electrical energy storage 10 has a plurality of battery cells. The battery cells can be formed as prismatic battery cells, for example. The electrical energy storage 10 can thus be formed as a high-voltage battery.

The heat conduction device 14 further has at least one spring element 20, here a plurality of spring elements 20. A respective installation direction in the motor vehicle 12 is further shown by the respective axes x, y and z. The z-axis here describes in particular a vertical direction of the vehicle, the y-axis a transverse direction of the vehicle, and the x-axis a longitudinal direction of the vehicle. The electrical energy storage 10 further has a housing wall 22 that is in contact with the at least one heat conduction element 16. The housing wall 22 can in particular be in contact with a cooling device of the electrical energy storage 12 in turn, whereby heat Wy generated by the battery cell can be delivered to the housing wall 22 via the heat conduction element 16, and then to the cooling device in turn. The housing wall 22 is in particular a lower housing wall 22 of the housing.

It is in particular shown that the heat conduction element 16 is arranged rotatably on a holding device 24 of the heat conduction device 14, and the spring element 20 is arranged on the heat conduction element 16 in such a way that a rotational movement 26 of the heat conduction element 16 is cushioned. The heat conduction element 16 can in particular be rotatably mounted around a point of rotation 28.

It can in particular be seen that the heat conduction element 16 is formed as an S-shape when viewed in a cross-section of the heat conduction element 16. FIG. 1 further shows that the heat conduction device 14 has a plurality of respectively rotatably mounted heat conduction elements 16.

It is further shown in FIG. 1 that the spring element 20 is in particular formed as a leaf spring, wherein it is further shown that two spring elements 20 are respectively arranged on the heat conduction element 16.

Figure 2:
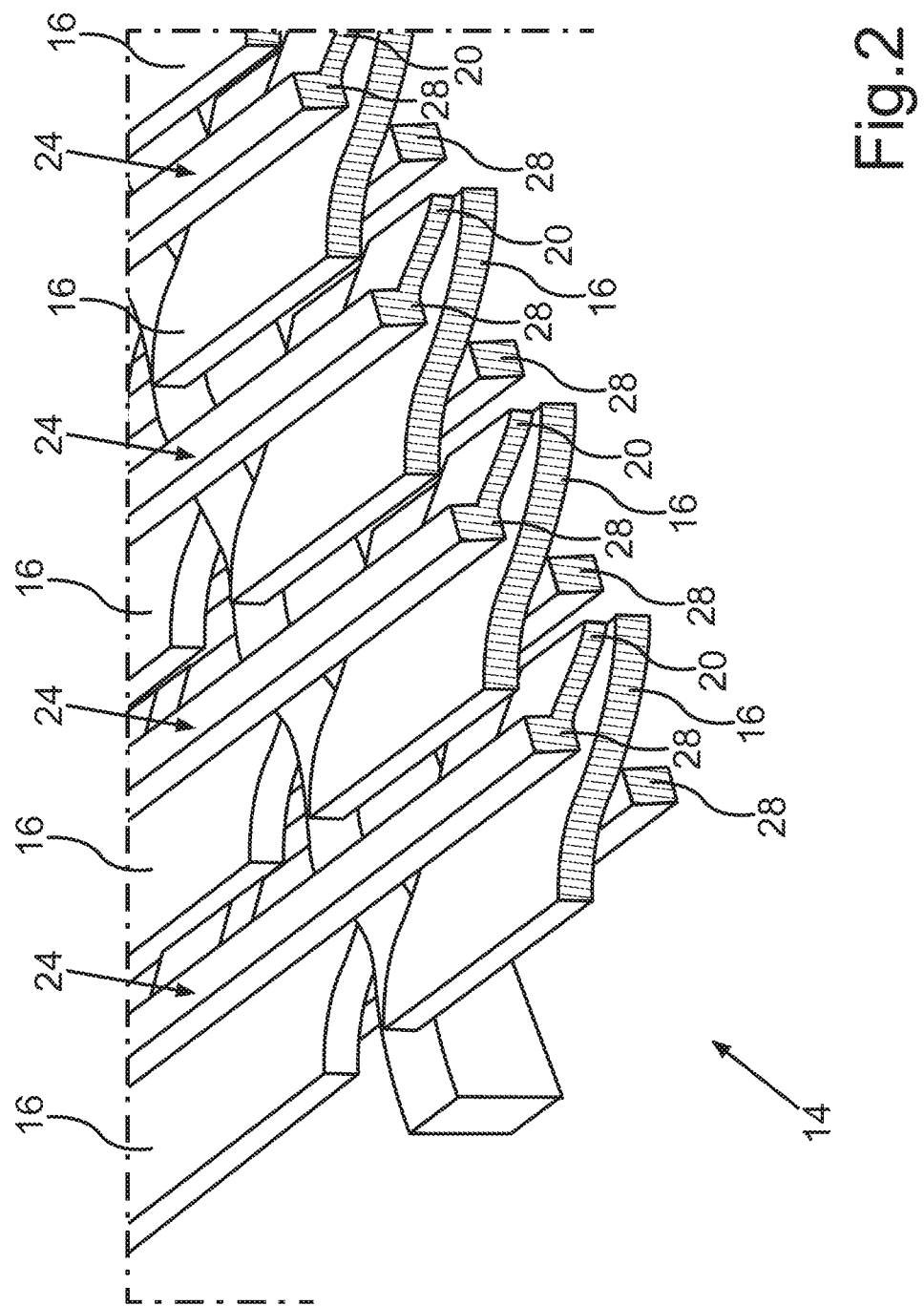
FIG. 2 shows a schematic perspective view of an embodiment of the heat conduction device.

FIG. 2 shows a schematic perspective view of a further embodiment of the heat conduction device 14. It is in particular shown here that the plurality of respectively rotatably mounted heat conduction elements 16 is arranged in layers. The heat conduction elements 16 thus in particular overlap at least partially.

It can in particular be provided that the heat conduction element 16 is formed from aluminum. The holding device 24 can in particular be formed from plastic, the holding device

24 can in particular be a plastic injection-moulded part. The spring element 20 can also in particular be formed from plastic.

It is thus in particular shown in FIG. 2 that the heat conduction elements 16 are formed as small individual leaves, in particular as thermal transfer elements that serve the heat conduction and can be formed from a heat-conducting material, e.g., aluminum, for example. These heat conduction elements 16 are received in the holding device 24, which simultaneously rotatably mounts these heat conduction elements in a spring-loaded manner, and which can also be formed from plastic, for example.

Compared with a sheet-metal plate known from the prior art, this has the advantage that the thermal transfer elements can be arranged in layers, and thus the number of the thermal transfer elements selected can be significantly higher. The plastic springs, in other words the spring elements 20, can further be relatively freely arranged in the holding device 24, whereby low spring rates are also possible.

It is in particular thus enabled that the components of the heat conduction device 14 or the electrical energy storage 10 can be produced in a very cost-effective manner. The heat conduction plates are very easy to mount and dismount in the motor vehicle 12 or in the electrical energy storage 10. A very simple and reversion-friendly battery construction can thus further be provided, whereby the battery construction is cost-effective and has a good recyclability. Construction weight can also be saved, as the heat conduction elements 20 in particular have a lower weight than the heat conduction paste, for example.

Overall, the figures show a heat conduction plate for usage in HV batteries.

LIST OF REFERENCE CHARACTERS

10 electrical energy storage
12 motor vehicle
14 heat conduction device
16 heat conduction element
20 spring element
22 housing wall
24 holding device
26 rotational movement
28 point of rotation
x x-axis
y y-axis
z z-axis
Wy heat

The invention claimed is:

1. A heat conduction device (14) for an electrical energy storage (10) of an at least partially electric motor vehicle (12), comprising:
   a heat conduction element (16) that is configured to be in contact with a battery cell of the electrical energy storage (10) and to dissipate heat (Wy) from the battery cell;
   a first spring element (20) that is configured to exert a defined spring force between the battery cell and the heat conduction element (16); and
   a holding device (24);
   wherein the heat conduction element (16) is rotatably mounted around a point of rotation (28) on the holding device (24) and wherein the first spring element (20) is disposed on the heat conduction element (16) and/or on the holding device (24) such that a rotational movement (26) of the heat conduction element (16) around the point of rotation (28) is cushioned.

2. The heat conduction device (14) according to claim 1, wherein the heat conduction element (16) is aluminum.

3. The heat conduction device (14) according to claim 1, wherein the holding device (24) is plastic.

4. The heat conduction device (14) according to claim 1, wherein the holding device (24) is a plastic injection-moulded part.

5. The heat conduction device (14) according to claim 1, wherein the heat conduction element (16) is formed in an S-shape when viewed in a cross-section of the heat conduction element (16).

6. The heat conduction device (14) according to claim 5, wherein the heat conduction device (14) has a plurality of respectively rotatably mounted S-shaped heat conduction elements (16).

7. The heat conduction device (14) according to claim 6, wherein the plurality of respectively rotatably mounted S-shaped heat conduction elements (16) are disposed in layers.

8. The heat conduction device (14) according to claim 1, wherein the first spring element (20) is plastic.

9. The heat conduction device (14) according to claim 1, wherein the first spring element (20) is a leaf spring.

10. The heat conduction device (14) according to claim 1, further comprising a second spring element (20) disposed on the heat conduction element (16) and/or the holding device (24).

* * * * *